Patented Sept. 20, 1949

2,482,533

UNITED STATES PATENT OFFICE 2,482,533

FLUX

Ray Andrews, Washington, Pa., assignor to B. F. Drakenfeld & Co., Inc., New York, N. Y., a corporation of New York No Drawing. Application April 10, 1947, Serial No. 740,709

2 Claims. (Cl. 106—48)

My invention is directed to the production of a flux for glass colors having (1) a melting point below 1150° F., rendering it suitable for application to glass articles, (2) a coefficient of expansion of .000009 making it satisfactory for use on glass of comparable coefficient, (3) a fair chemical stability and (4) not subject to discoloration by the action of reducing agents or by sulphides.

Most glass colors and enamels contain lead, but these discolor under the conditions above referred to, and are not suitable for the purpose I have in mind.

My improved flux is characterized by having as its major constituents zinc oxide, boric oxide and silica, and contains only limited percentages of basic oxides other than that of zinc. On account of the low melting point of this flux, I may introduce certain refractory or amphoteric oxides, for the special properties which they impart, and still maintain a flux sufficiently low melting for use on glass articles even when the usual opacifiers or coloring pigments are milled in to form a glass enamel.

The following batch when melted will yield a flux embodying my invention:

Table I.—Batch compositions

| | |
|---|---|
| Zinc oxide | 140 |
| Flint | 50 |
| Boric acid | 100 |
| Lithium carbonate | 20 |
| Calcium fluoride | 15 |
| Sodium nitrate | 40 |
| Titanium oxide | 30 |

Table II.—Flux composition

| | |
|---|---|
| ZnO | 45.1 |
| $SiO_2$ | 16.1 |
| $B_2O_3$ | 18.3 |
| $Li_2O$ | 2.6 |
| CaO | 3.5 |
| $Na_2O$ | 4.7 |
| $TiO_2$ | 9.7 |

The above percentages may be departed from to a limited extent. Thus, satisfactory fluxes are found in the following ranges:

Table III

| | Per cent |
|---|---|
| ZnO | 40.5 to 49.6 |
| $SiO_2$ | 14.5 to 17.7 |
| $B_2O_3$ | 16.5 to 20 |
| $Li_2O$ | 2.3 to 2.8 |
| CaO | 3.3 to 3.8 |
| $Na_2O$ | 4.2 to 5.2 |
| $TiO_2$ | 8.7 to 11 |

In specifying in the following claims the approximate percentages given in Table II, I mean to include within my claims the ranges given in Table III.

It will be noted that the sum of the percentages of the two alkalies (lithia and soda) in the above flux aggregates 6.5 to 8%.

It will be further noted that the soda contents of all of the above flux is not over 5.2%. I have found that this low soda is of special value when the enamel made therefrom is to be applied to electric lamp bulbs by dipping the bulb in the enamel ground in alcohol, as is the standard practice. When the soda content is over 5.2% there is a tendency of the alcohol to react with the soda of the flux to form a sodium alcoholate, which when the dipped bulb is fired breaks down to leave a residue of carbon on the bulb, giving a grey rather than a white enamel.

This application is a continuation-in-part of my prior application filed December 9, 1944, Serial No. 567,536, now abandoned.

Having thus described my invention what I claim as new and desire to secure by United States Letters Patent, is:

1. A flux analytically containing the following oxides in approximately the following percentages; i. e., ZnO, 45.1; $SiO_2$, 16.1; $B_2O_3$, 18.3; $Li_2O$, 2.6; CaO, 3.5; $Na_2O$, 4.7.

2. A flux analytically containing the following oxides in substantially the following percentages; i. e., ZnO, 45.1; $SiO_2$, 16.1; $B_2O_3$, 18.3; $Li_2O$, 2.6; CaO, 3.5; $Na_2O$, 4.7; $TiO_2$, 9.7.

RAY ANDREWS.

REFERENCES CITED

The following references are of record in the file of this patent:

UNITED STATES PATENTS

| Number | Name | Date |
|---|---|---|
| 2,063,252 | Kinzie | Dec. 8, 1936 |
| 2,247,196 | Goodwin | June 24, 1941 |